United States Patent
Isaacson et al.

(10) Patent No.: US 11,782,742 B2
(45) Date of Patent: *Oct. 10, 2023

(54) JUST-IN-TIME RENDERING USING DISTRIBUTED CACHE SERVERS

(71) Applicant: Diamonds Direct, LC, Draper, UT (US)

(72) Inventors: Matt Jeffrey Isaacson, Saratoga Springs, UT (US); William Edwin Rappleye, III, Draper, UT (US)

(73) Assignee: DIAMONDS DIRECT, LC, Draper, UT (US)

( * ) Notice: Subject to any disclaimer, the term of this patent is extended or adjusted under 35 U.S.C. 154(b) by 523 days.

This patent is subject to a terminal disclaimer.

(21) Appl. No.: 16/927,633

(22) Filed: Jul. 13, 2020

(65) Prior Publication Data

US 2022/0012078 A1    Jan. 13, 2022

(51) Int. Cl.
*G06F 16/955* (2019.01)
*G06F 3/048* (2013.01)
(Continued)

(52) U.S. Cl.
CPC ........ *G06F 9/45516* (2013.01); *G06F 16/172* (2019.01); *G06F 16/532* (2019.01);
(Continued)

(58) Field of Classification Search
CPC .... G06F 9/45516; G06F 16/538; G06F 16/54; G06F 16/532; G06F 16/172; G06F 3/0482; G06T 11/60; G06T 1/20; G06T 1/60

See application file for complete search history.

(56) References Cited

U.S. PATENT DOCUMENTS

| 11,004,246 | B1 * | 5/2021 | Cheng | G06F 3/0481 |
| 2008/0201331 | A1 * | 8/2008 | Eriksen | G06F 16/9574 |

(Continued)

OTHER PUBLICATIONS

Maria Shugrina et al., Fab Forms: Customizable Objects for Fabrication with Validity and Geometry Caching, Aug. 9-13, 2015, [Retrieved on Apr. 17, 20237]. Retrieved from the internet: <URL: https://dl.acm.org/doi/pdf/10.1145/2766994> 12 Pages (1-12) (Year: 2015).*

*Primary Examiner* — Anibal Rivera
(74) *Attorney, Agent, or Firm* — Workman Nydegger

(57) ABSTRACT

A computer system for just-in-time rendering using distributed cache servers can receive at least one edited photo comprising at least one available selection of a customization option. The computer system can also cache the at least one edited photo of the at least one available selection of the customization option. Further, the computer system can receive a user request comprising the at least one available selection of the customization option and at least one available selection of at least one additional customization option. The computer system can also stitch the at least one edited photo comprising the at least one available selection of the customization option with at least one additional edited photo comprising the at least one available selection of the at least one additional customization option to render a product photo. Finally, the computer system can cache the requested product photo and send display instructions for the cached requested product photo to a user over a network.

18 Claims, 4 Drawing Sheets

(51) Int. Cl.
*G06F 9/455* (2018.01)
*G06T 1/60* (2006.01)
*G06T 1/20* (2006.01)
*G06F 16/172* (2019.01)
*G06F 16/532* (2019.01)
*G06F 16/538* (2019.01)
*G06F 16/54* (2019.01)
G06F 3/0482 (2013.01)

(52) U.S. Cl.
CPC ............ *G06F 16/538* (2019.01); *G06F 16/54* (2019.01); *G06T 1/20* (2013.01); *G06T 1/60* (2013.01); G06F 3/0482 (2013.01)

(56) References Cited

U.S. PATENT DOCUMENTS

| | | | | |
|---|---|---|---|---|
| 2011/0153463 | A1* | 6/2011 | Lovelace | G06Q 10/10 705/26.5 |
| 2012/0331422 | A1* | 12/2012 | High | G06Q 10/00 715/849 |
| 2013/0173040 | A1* | 7/2013 | Wells | G06F 30/00 700/98 |
| 2019/0122279 | A1* | 4/2019 | Mordovskoi | G06Q 30/0641 |
| 2019/0266656 | A1* | 8/2019 | Watkins | G06Q 30/0631 |

* cited by examiner

JUST-IN-TIME RENDERING USING DISTRIBUTED CACHE SERVERS

BACKGROUND OF THE INVENTION

Custom jewelry provides a customer the opportunity to express their individual style and personality. However, most jewelry retailers may not produce and show the customer a product photo with the customer's selected customizations. In some cases, a jewelry retailer may show the customer a three-dimensional rendering of a custom piece of jewelry. Three-dimensional renderings, however, lack the detail an actual photo of the product offers. Accordingly, the customer may be left without a realistic impression of what his or her selected customizations will look like as a completed product.

Further, jewelry retailers may sell parts of a piece of custom jewelry as individual line items rather than a single, complete product. If the jewelry retailer does produce a product photo, the photo typically comprises a few photos of the limited customizations cut together at the end of the customization process. Again, such piecemeal product photos may not give the customer an accurate view of the final piece of custom jewelry.

The number of available permutations in available materials, finishes, and jewels makes showing more than a limited number of finished photo combinations impractical, and jewelers tend to rely on computerized renderings to suggest the look of a finished product. Computerized renderings, however, are often easily perceptible to the human eye, and still suffer from the difficulty of meeting the expectations of the end product.

Accordingly, there are a number of problems in the art that can be addressed.

BRIEF SUMMARY OF THE INVENTION

Implementations of the present invention provide systems, methods, and computer program products directed to improving the custom jewelry design process. For example, a system in accordance with at least one implementation of the present invention can comprise a server in a network comprising one or more remote client computer systems, the server configured for just-in-time rendering using a distributed cache server. Additionally, a method in accordance with at least one implementation of the present invention can comprise a server comprising one or more processors and one or more computer-readable media having stored thereon executable instructions that when executed by the one or more processors configure the server to perform a method of just-in-time rendering using a distributed cache server. Accordingly, at least one implementation of the present invention improves the process of designing custom jewelry.

For example, a server for just-in-time rendering using a distributed cache server can receive at least one edited photo comprising at least one available selection of a customization option. The server can also cache the at least one edited photo comprising the at least one available selection of the customization option. Further, the server can receive a user request comprising the at least one available selection of the customization option and at least one available selection of at least one additional customization option. Based on the user request, the server can stitch the at least one edited photo comprising the at least one available selection of the customization option with at least one additional edited photo comprising the at least one available selection of the at least one additional customization option to render a product photo having visual elements of the at least one edited photo and the at least one additional edited photo. Finally, the server can cache the requested product photo and send display instructions for the cached requested product photo to a user over a network.

In addition, a computerized method for just-in-time rendered using a distributed cache server can comprise receiving at least one edited photo comprising at least one available selection of a customization option. The method can also include caching the at least one edited photo comprising the at least one available selection of the customization option. Further, the method can comprise receiving a user request comprising the at least one available selection of the customization option and at least one available selection of at least one additional customization option. Finally, the method can comprise stitching the at least one edited photo comprising the at least one available selection of the customization option with at least one additional edited photo comprising the at least one available selection of the at least one additional customization option to render a requested product photo having visual elements of the at least one edited photo and the at least one additional edited photo. Finally, the method can include caching the requested product photo and sending display instructions for the cached requested product photo to a user over a network.

Similarly, a computerized method for just-in-time rendering using a distributed cache server can comprise receiving at least one edited photo comprising at least one available selection of a customization option. The method can further comprise caching, at a caching module, the at least one edited photo comprising the at least one available selection of the customization option. Also, the method can include receiving a user request comprising the at least one available selection of the customization option and at least one available selection of at least one additional customization option. The method can comprise accessing, within an image database, at least one edited photo comprising the at least one available selection of the customization option and at least one additional edited photo comprising the at least one available selection of the at least one additional customization option. Even further, the method can include layering, with a stitching module, the at least one edited photo comprising the at least one available selection of the customization option with the at least one additional edited photo comprising the at least one available selection of the at least one additional customization option to render a requested product photo having visual elements of the at least one edited photo and the at least one additional edited photo. Finally, the method can comprise caching, at a caching module, the requested product photo and sending display instructions for the cached requested product photo to a user over a network.

Finally, a computerized method for just-in-time rendering using a distributed cache server can comprise sending over a network at least one edited photo comprising at least one available selection of a customization option to a cache server, wherein the cache server is configured to cache the at least one edited photo comprising the at least one available selection of the customization option. The method can include sending a request over the network comprising the at least one available selection of the customization option and at least one available selection of at least one additional customization option to the cache server. The cache server can be configured to stitch the at least one edited photo comprising the at least one available selection of the customization option with at least one additional edited photo comprising the at least one available selection of the at least one additional customization option to render a requested product photo having visual elements of the at least one edited photo and the at least one additional edited photo. Finally, the method can include receiving display instructions for the cached requested product photo over the network.

Additional features and advantages will be set forth in the description which follows, and in part will be obvious from the description, or may be learned by practice. The features and advantages may be realized and obtained by means of the instruments and combinations particularly pointed out in the appended claims. These and other features will become more fully apparent from the following description and appended claims, or may be learned by the practice of the examples as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
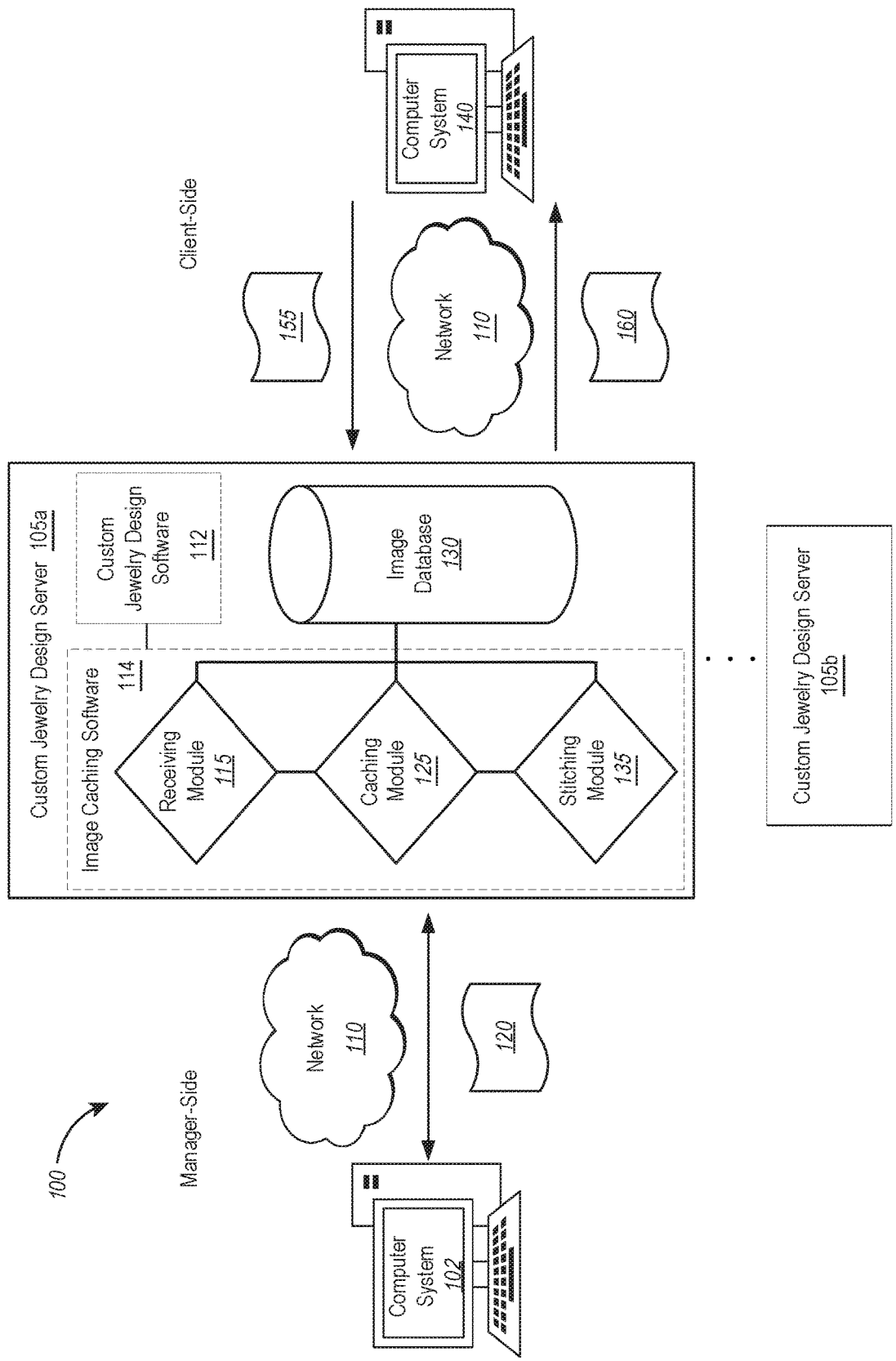
FIG. 1 depicts a schematic of a computerized system for just-in-time rendering using a distributed cache server.

Implementations of the present invention provide systems, methods, and computer program products directed to improving the custom jewelry design process. For example, a system in accordance with at least one implementation of the present invention can comprise a server in a network comprising one or more remote client computer systems, the server configured for just-in-time rendering using a distributed cache server. Additionally, a method in accordance with at least one implementation of the present invention can comprise a server comprising one or more processors and one or more computer-readable media having stored thereon executable instructions that when executed by the one or more processors configure the server to perform a method of just-in-time rendering using a distributed cache server. Accordingly, at least one implementation of the present invention improves the process of designing custom jewelry.

For example, in at least one implementation of the present invention, the server can receive at least one edited photo comprising at least one available selection of a customization option. The server can also cache the at least one edited photo comprising the at least one available selection of the customization option. Further, the server can receive a user request comprising the at least one available selection of the customization option and at least one available selection of at least one additional customization option. Based on the user request, the server can stitch the at least one edited photo comprising the at least one available selection of the customization option with at least one additional edited photo comprising the at least one available selection of the at least one additional customization option to render a product photo having visual elements of the at least one edited photo and the at least one additional edited photo. Finally, the server can cache the requested product photo and send display instructions for the cached requested product photo to a user over a network.

Because the server provides for "crowd-sourced" caching, latency can be reduced. The server can cache every user-requested product photo. Therefore, the speed at which the server provides a subsequent user's request comprising the same available selections can be significantly decreased because the product photo is already stitched and stored in cache memory.

Further, the storage of cached product photos can reduce the processing power required to serve the user the requested product photo. Because product photos can combine up to 50 edited photos, if product photos were not cached, every subsequent request of the product photo would require a significant amount of processing power to stitch the edited photo and then serve the requested product photo. Bandwidth consumption costs for website hosting is a primary expense for websites. Therefore, caching represents an optimization whereby hosting costs for a website manager can be reduced.

Accordingly, implementations of the present invention can improve the custom jewelry design process by providing the user with a realistic product photo throughout the customization process. In at least one implementation, the user can see exactly how their customization selections affect the appearance of the piece of jewelry. Further, because the edited photos and product photos can be stored as cached images, the load times for the product photos can be reduced.

Turning now to the Figures, FIG. 1 depicts a schematic of a computerized system 100 for just-in-time rendering using distributed cache servers. As shown, a manager-side computer system 102 and a client-side computer system 140 can be in communication with a custom jewelry design server 105a. The manager-side computer system 102 can communicate with the custom jewelry design server 105a through a network connection 110. Similarly, the client-side computer system 140 can communicate with the custom jewelry design server 105a via the network connection 110. One skilled in the art will appreciate that the depicted schematic is merely exemplary, and although the computer systems 102 and 140 are depicted in FIG. 1 as desktop computers, the computer system 102 or 140 can take a variety of forms. For example, the computer system 102 or 140 can be a laptop computer, a tablet computer, a wearable device, a mobile phone, a mainframe, etc. As used herein, the term "computer system" includes any device, system, or combination thereof that includes one or more processors, and a physical and tangible computer-readable memory capable of having thereon computer-executable instructions that are executable by the one or more processors. The computer system 102 or 140 can be distributed over a network environment and can include multiple constituent computer systems.

As shown in FIG. 1, the custom jewelry design server 105a can comprise one or more computer-readable storage media having stored thereon executable instructions that when executed by the one or more processors configure the server to execute software, including image caching software 114. The image caching software 114 can comprise various modules, such as a receiving module 115, a caching module 125, and a stitching module 135. As used herein, a module can comprise a software component, including a software object, a hardware component, such as a discrete circuit, a FPGA, a computer processor, or some combination of hardware and software. One will understand, however, that other components and modules can be combined, associated, or separated in ways other than shown in FIG. 1 and still accomplish the purposes of the custom jewelry design server 105a. Accordingly, the modules 115, 125, and 135 of FIG. 1 are only shown for illustrative and exemplary purposes.

The one or more processors can comprise an integrated circuit, a field-programmable gate array (FPGA), a microcontroller, an analog circuit, or any other electronic circuit capable of processing input signals. The memory can be physical system memory, which can be volatile, non-volatile, or some combination of the two. The term "memory" can also be used herein to refer to non-volatile mass storage such as physical storage media. Examples of computer-readable physical storage media include RAM, ROM, EEPROM, solid state drives ("SSDs"), flash memory, phase-change memory ("PCM"), optical disk storage, magnetic disk storage or other magnetic storage devices, or any other hardware storage device(s).

FIG. 1 shows that the custom jewelry design server 105a can receive an edited photo 120 from the manager-side computer system 102 via a network connection 110. The receiving module 115 of the image caching software 114 can receive the edited photo 120. The edited photo 120 can be sized and oriented such that the edited photo 120 is ready to be layered with additional edited photos and flattened (e.g., stitched) to produce a product photo. In at least one implementation, the receiving module 115 is configured to receive a raw image file. Additionally, the receiving module 115 can comprise a user-interface through which the manager can edit the raw image file.

The edited photo 120 can comprise an image of at least one available selection of a customization option. Customizations options can include material, profile, ring weight, ring width, ring size, finish, outside feature, etc. Exemplary available selections for the material customization option include a wide variety of metals, including titanium, cobalt chrome, zirconium, tantalum, Damascus, yellow gold, white gold, rose gold, etc. The user can have the option of choosing the fineness of the selected metal (e.g., 10K yellow gold, 14K yellow gold, 18K yellow gold, etc.). Additionally, the user can have the option of choosing the pattern of the selected metal (e.g., woodgrain Damascus, marble Damascus, basketweave Damascus, etc.).

The edited photo 120 can show a piece of jewelry made of a specific material. Additionally or alternatively, the edited photo 120 can show a piece of jewelry made of a specific material and with a specific finish (e.g., two available selections of two customization options). In at least one implementation, the edited photo 120 comprises an image file containing at least three sizes of the edited photo 120. The edited photo 120 can be digitally edited to display an alternative available selection. For example, an edited photo showing a diamond can be edited to a different hue, thereby displaying an aqua diamond.

The receiving module 115 of the image caching software 114 can send the edited photo 120 to the caching module 125. The caching module 125 can cache the edited photo 120 and send the cached edited photo to an image database 130 for storage. The caching module 125 can cache at least three sizes of the edited photo 120. Although FIG. 1 shows the image database 130 outside the image caching software 114, one skilled in the art will appreciate that the image database 130 can be within the image caching software 114 or somewhere else within the custom jewelry design server 105a. FIG. 1 further shows the caching module 125 separate from the image database 130, but in at least one implementation, the caching module 125 and the image database 130 can be combined as a cache memory.

The image caching software 114 can validate the edited photo 120 before caching. If an error in the edited photo 120 is discovered, the image caching software 114 can send a notification to the manager-side computer system 102. In at least one implementation a validation module (not shown) performs the edited photo 120 validation.

In at least one implementation, the image caching software 114 is configured to receive a request from the manager-side computer system 102 to cache a product photo including specific available selections. The request can be received by the receiving module 115. The receiving module 115 can search the image database 130 to determine if a cached product photo comprising the requested available selections is stored therein. If a cached product photo comprising the requested available selections is stored within the image database 130, the request can terminate. However, if a cached product photo comprising the requested available selections is not stored within the image database 130, the image database 130 can send multiple cached edited photos (which can include one or more cached photo products) to the stitching module 135, each comprising one or more of the available selections requested.

The stitching module 135 can layer the multiple cached edited photos and flatten the multiple cached edited photos into an uncached product photo comprising the requested available selections. The stitching module 135 can determine the order in which the multiple cached edited photos are layered using a predetermined layering protocol. The uncached product photo can be sent by the stitching module 135 to the caching module 125. The caching module can cache the uncached product photo and send the cached product photo to the image database 130 for storage.

In at least one implementation, the stitching module 135 can layer two or more cached edited photos each comprising one available selection. Additionally or alternatively, the stitching module 135 can layer one or more cached edited photos each comprising one available selection with one or more cached edited photos each comprising more than one available selection. The stitched module 135 can also layer two or more cached edited photos each comprising more than one available selection. Further, the stitching module 135 can layer a cached product photo with one or more cached edited photos each comprising at least one available selection.

FIG. 1 also shows that the client-side computer system 140 can communicate with the custom jewelry design server 105a, such as over network 110. As stated above, the custom jewelry design server 105a can comprise one or more computer-readable storage media having stored thereon executable instructions that when executed by the one or more processors configure the server to execute software, including custom jewelry design software 112. In at least one implementation, the custom jewelry design software 112 allows the user to create, modify, analyze, and optimize customization options (e.g., material, profile, ring weight, ring width, ring size, finish, outside feature, etc.). The custom jewelry design software 112 can display images and graphical controls to the user through a computer monitor and can receive input from the user through a keyboard and/or mouse. Accordingly, the user can utilize the client-side computer system 140 to communicate with the custom jewelry design software 112 and interact with customization options to create a custom piece of jewelry.

As shown in FIG. 1, the client-side computer system 140 can send the custom jewelry design software 112 a user request 155 comprising the at least one available selection of at least one customization option via the network connection 110. The receiving module 115 of the image caching software 114 can receive a request from the custom jewelry design software 112 for a product photo comprising the at least one available selection.

In at least one implementation, and as shown in FIG. 1, the receiving module 115 can search the image database 130 to determine if a cached product photo comprising the requested at least one available selection of the at least one customization option is stored therein. If a cached product photo comprising the requested available selections is stored within the image database 130, the image caching software can send the custom jewelry design software 112. The custom jewelry design software 112 can send the requested cached product photo 160 to the client-side computer system 140 via the network connection 110. Additionally or alternatively, the image caching software 114 can send the requested cached product photo 160 directly to the client-side computer system 140.

As shown in FIG. 1, if a cached product photo comprising the requested at least one available selection is not stored within the image database 130, the image database 130 can send multiple cached edited photos (which can include one or more cached photo products) to the stitching module 135, each comprising one or more of the requested available selections.

The stitching module 135 can layer the multiple cached edited photos and flatten the multiple cached edited photos into a requested uncached product photo comprising the requested available selections. As such, the requested uncached product photo can have visual elements of the multiple cached edited photos. As described above, the stitching module 135 can determine the order in which the multiple cached edited photos are layered using a predetermined layering protocol. The requested uncached product photo can be sent by the stitching module 135 to the caching module 125. The caching module can cache the requested uncached product photo and send the requested cached product photo 160 to the image database 130 for storage. The custom jewelry design software 112 can send rendering instructions for the requested cached product photo 160 to the client-side computer system 140 via the network connection 110. Additionally or alternatively, the image caching software 114 can send rendering instructions for the requested cached product photo 160 directly to the client-side computer system 140.

In at least one implementation, the stitching module 135 can layer two or more cached edited photos each comprising one available selection. Additionally or alternatively, the stitching module 135 can layer one or more cached edited photos each comprising one available selection with one or more cached edited photos each comprising more than one available selection. The stitched module 135 can also layer two or more cached edited photos each comprising more than one available selection. Further, the stitching module 135 can layer a cached product photo with one or more cached edited photos each comprising at least one available selection.

Although only one client-side computer system 140 is shown in FIG. 1, the present invention is not so limited. The custom jewelry design server 105*a* can be in communication with any number of computer systems. Because the image caching software 114 caches every requested product photo, the speed at which the server provides a subsequent user's request comprising the same available selections can be significantly reduced.

In at least one implementation, the custom jewelry design server 105*a* can be associated with a content delivery network ("CDN"). As shown in FIG. 1, the custom jewelry design server 105*a* can be connected to at least a second custom jewelry design server 105*b*. In at least one implementation the custom jewelry design server 105*a* can be one in a network of geographically distributed group of image caching servers which work together to improve delivery speeds. Requested product photos can be cached at the nearest geographic custom jewelry design server 105*a*. In at least one implementation, the distributed group of image caching servers are connected by an origin server. The origin server can collect data from each of the image caching servers and distribute the collected data to each of the image caching servers.

Figure 2A:
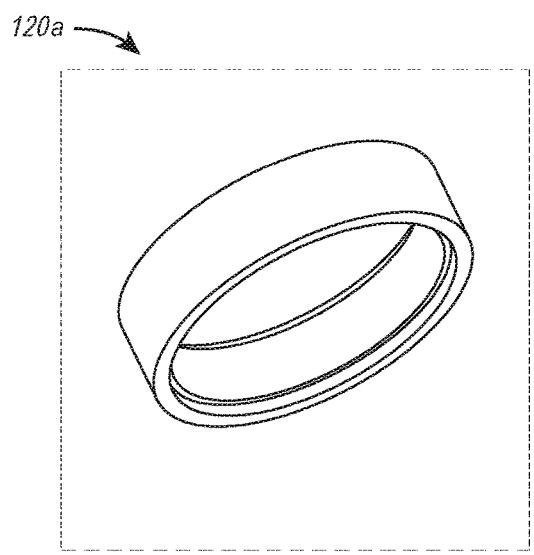
FIG. 2A shows an edited photo.
Figure 2B:
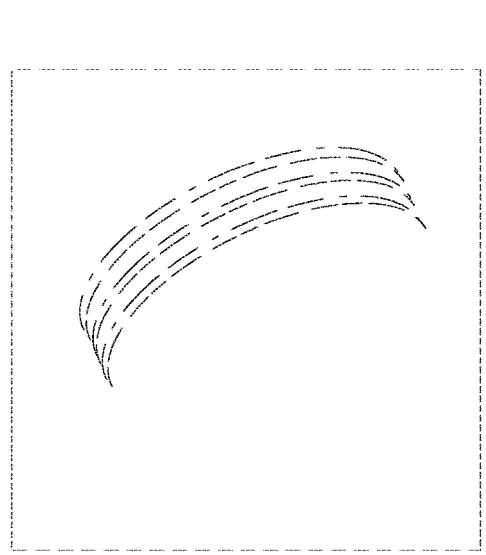
FIG. 2B shows an alternative edited photo to that shown in FIG. 2A.
Figure 2C:
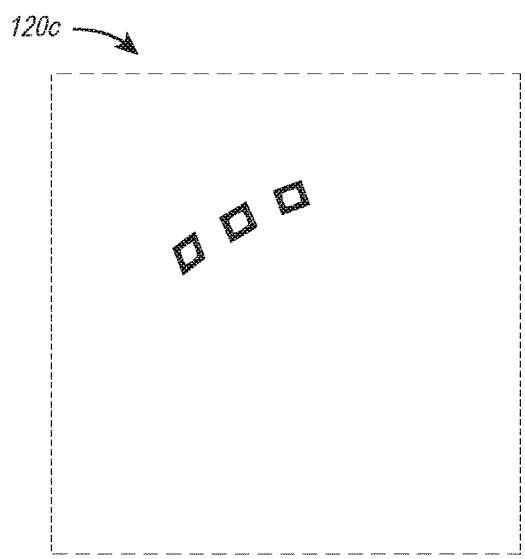
FIG. 2C shows an alternative edited photo to that shown in FIGS. 2A-2B

FIGS. 2A-2C show exemplary edited photos 120*a*-120*c* comprising at least one available selection. For example, FIG. 2A illustrates an edited photo 120*a* comprising one available selection for the material customization option (e.g., "18K yellow gold"). Additionally, the edited photo 120*a* can comprise one available selection for the profile customization option (e.g., "flat"), the ring weight customization option (e.g., "premium"), and ring width customization option (e.g., "7 mm").

As shown, FIG. 2B shows an edited photo 120*b* comprising one available selection for the finish customization option (e.g., "satin"). Similarly, an edited photo 120*c* shown in FIG. 2C comprises one available selection within the outside feature customization option (e.g., "gemstones"). Additionally, the edited photo 120*c* comprises one available selection option for the secondary customization options gemstone arrangement (e.g., "eternity") and gemstone color (e.g., diamond), gemstone shape (e.g., "princess"), gemstone size (e.g., "0.06 carat"), and gemstone setting style (e.g., "bezel"). As shown, edited photos 120 can comprise an available selection for a single customization option, or available selections for multiple customization options.

Figure 2D:
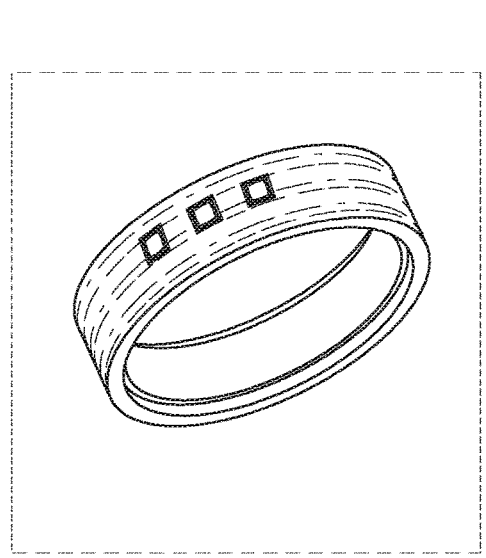
FIG. 2D shows a product photo comprising the edited photos shown in FIGS. 2A-2C.

FIG. 2D shows a product photo 205 created by layering the edited photos 120*a*-120*c*. As shown, the product photo 205 comprises the visual elements of the three edited photos 120*a*-120*c*. One skilled in the art will appreciate the available options and customizations options in FIGS. 2A-2D are merely exemplary and in no way limit the present invention. Additionally, any number of edited photos can be stitched to produce a product photo 205. For example, 1 to 50 edited photos can be stitched to produce a product photo 205.

Figure 3:
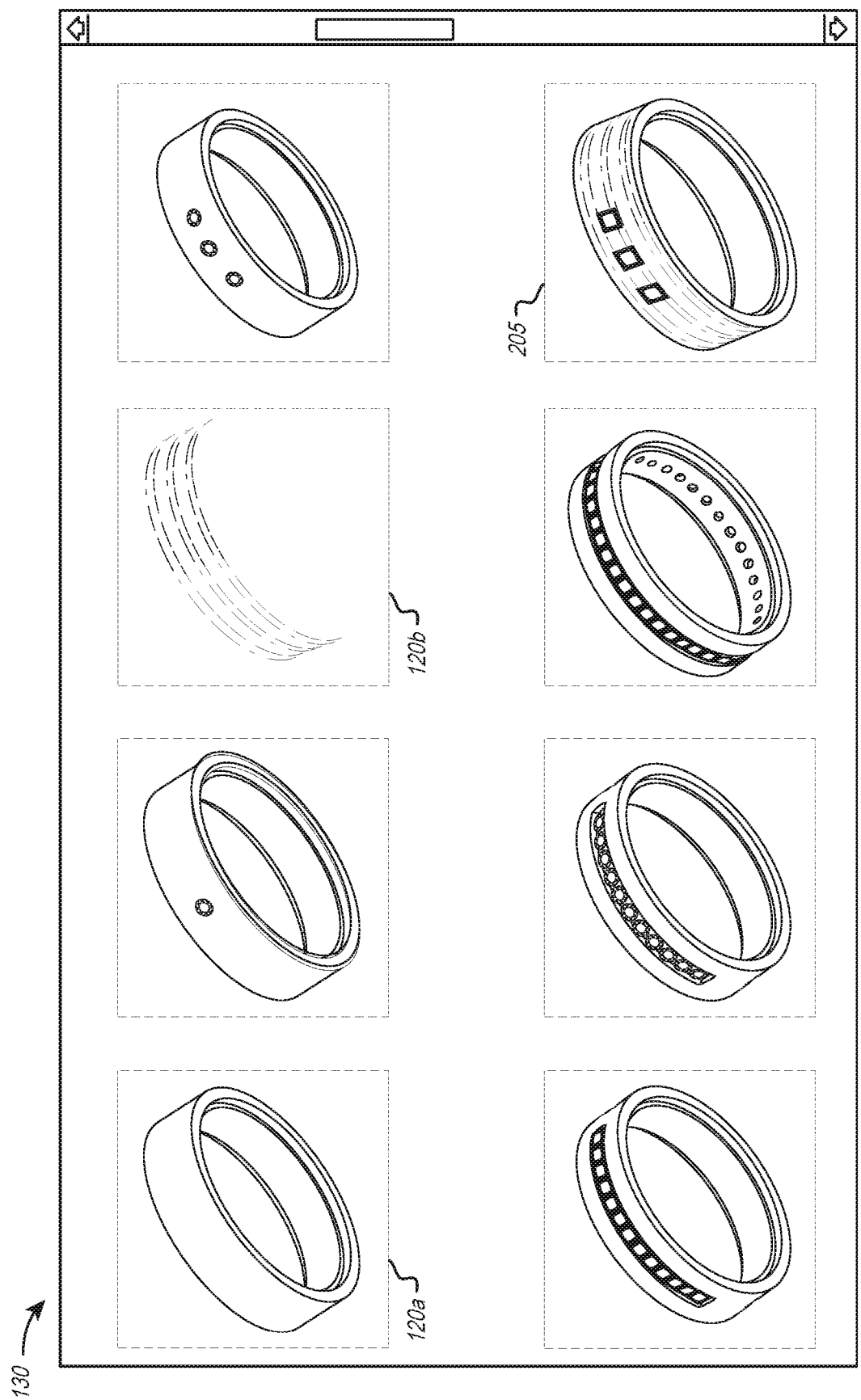
FIG. 3 shows an exemplary portion of an image database.

FIG. 3 shows an exemplary portion of the image database 130. In at least one implementation the image database is organized into subsets. The image database 130 can include a directory of edited photos 120. As shown in FIG. 3, the directory can include edited photos comprising an available selection for a single customization option or available selections for multiple customization options.

For example, edited photo 120*a* (also shown in FIG. 2A) comprises one available selection for the material customization option (e.g., "18K yellow gold"). Additionally, the edited photo 120a can comprise one available selection for the profile customization option (e.g., "flat"), the ring weight customization option (e.g., "premium"), and ring width customization option (e.g., "7 mm"). FIG. 3 also shows the directory can include edited photo 120b (also shown in FIG. 2B) comprising one available selection for the finish customization option (e.g., "satin").

FIG. 3 further shows that product photos, such as the product photo 205 can be in the directory of the image database 130. The product photo (also shown in FIG. 2D) can be created by layering the edited photos 120a-120c and therefore can comprise the visual elements of the three edited photos 120a-120c. One skilled in the art will appreciate that the exemplary portion of the image database 130 shown in FIG. 3 in no way limits the present invention to the edited photos or product photos shown. Thousands of photos can be stored within the image database 130.

Figure 4:
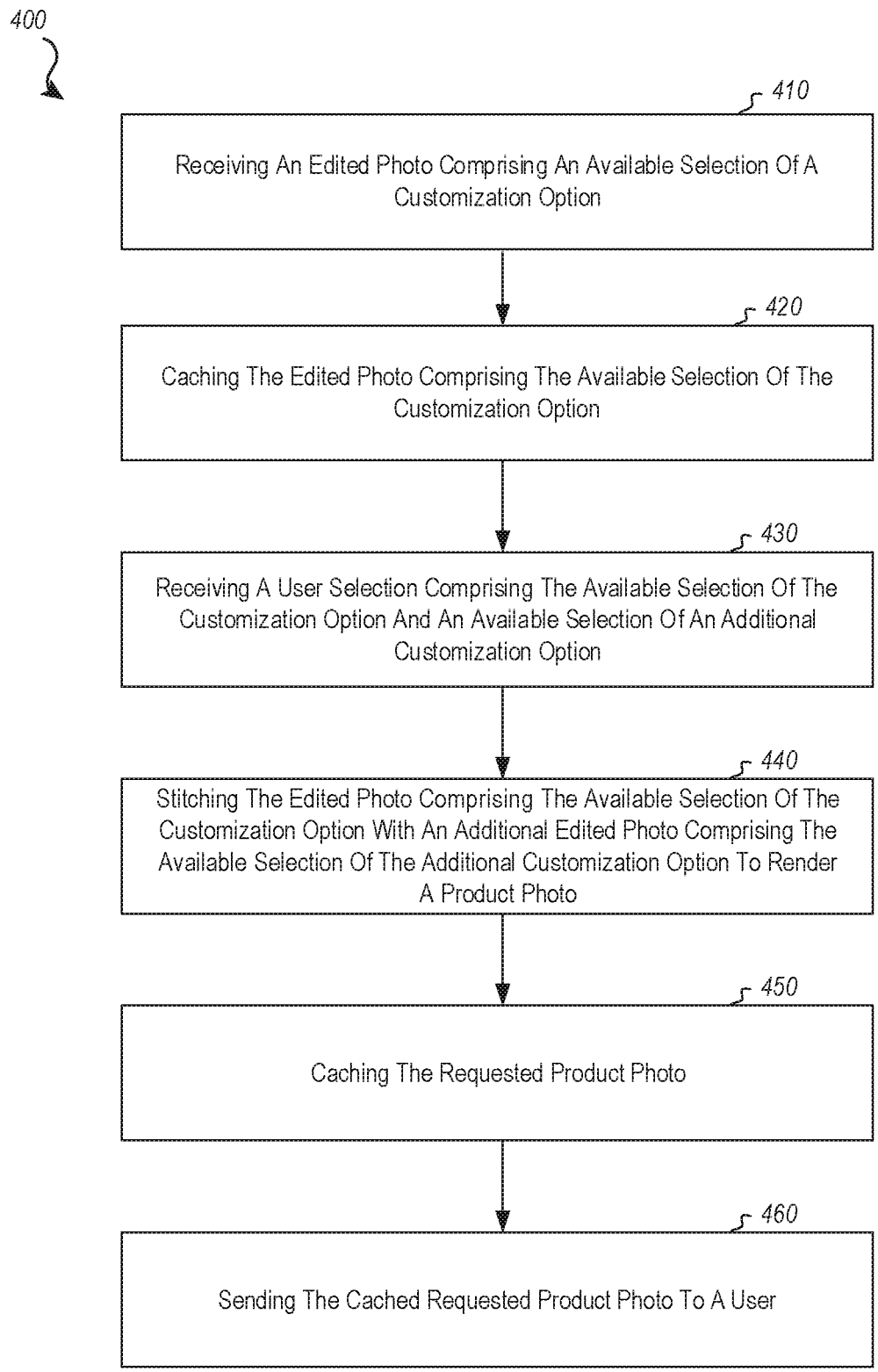
FIG. 4 illustrates a flow chart of a series of acts in a method for just-in-time rendering using a distributed cache server.

FIG. 4 illustrates a method 400 for just-in-time rendering using a distributed cache server. As shown, the method 400 can comprise act 410 of receiving an edited photo comprising an available selection of a customization option. Act 410 includes receiving at least one edited photo comprising at least one available selection of a customization option.

For example, FIG. 1 shows that the custom jewelry design server 105a can receive an edited photo 120 from the manager-side computer system 102 via a network connection 110. The receiving module 115 of the image caching software 114 can receive the edited photo 120. The edited photo 120 can be sized and oriented such that the edited photo 120 is ready to be layered with additional edited photos and flattened (e.g., stitched) to produce a product photo. The edited photo 120 can comprise an image of at least one available selection of a customization option.

FIG. 4 also shows that the method 400 can comprise act 420 of caching the edited photo comprising the available selection of the customization option. Act 420 includes caching the at least one edited photo comprising the at least one available selection of the customization option. For example, the receiving module 115 of the image caching software 114 can send the edited photo 120 to the caching module 125. The caching module 125 can cache the edited photo 120 and send the cached edited photo to the image database 130 for storage. The caching module 125 can cache at least three sizes of the edited photo 120. Although FIG. 1 shows the caching module 125 separate from the image database 130, one skilled in the art will appreciate that the caching module 125 and image database 130 can be combined as a cache memory.

As shown in FIG. 4, the method can comprise act 430 of receiving a user selection comprising the available selection of the customization option and an available selection of an additional customization option. Act 430 includes receiving a user request comprising the at least one available selection of the customization option and at least one available selection of at least one additional customization option.

FIG. 1 also shows the client-side computer system 140 can send the custom jewelry design software 112 a user request 155 comprising the at least one available selection of at least one customization option via the network connection 110. The receiving module 115 of the image caching software 114 can receive a request from the custom jewelry design software 112 for a product photo comprising the at least one available selection.

The method 400 can also comprise act 440 of stitching the edited photo comprising the available selection of the customization option with an additional edited photo comprising the available selection of the additional customization option to render a product photo. Act 440 includes based on the user request, stitching the at least one edited photo comprising the at least one available selection of the customization option with at least one additional edited photo comprising the at least one available selection of the at least one additional customization option to render a product photo having visual elements of the at least one edited photo and the at least one additional edited photo.

For example, if a cached product photo comprising the requested at least one available selection is not stored within the image database 130, the image database 130 can send multiple cached edited photos (which can include one or more cached photo products) to the stitching module 135, each comprising one or more of the requested available selections.

The stitching module 135 can layer the multiple cached edited photos and flatten the multiple cached edited photos into a requested uncached product photo comprising the requested available selections. As such, the requested uncached product photo can have visual elements of the multiple cached edited photos. As described above, the stitching module 135 can determine the order in which the multiple cached edited photos are layered using a predetermined layering protocol.

As shown in FIG. 4, the method 400 can comprise act 450 of caching the requested product photo. For example, the requested uncached product photo can be sent by the stitching module 135 to the caching module 125. The caching module can cache the requested uncached product photo and send the requested cached product photo 160 to the image database 130 for storage.

Finally, the method 400 can comprise act 460 of sending the cached requested product photo to a user. For example, the custom jewelry design software 112 can send rendering instructions for the requested cached product photo 160 to the client-side computer system 140 via the network connection 110. Additionally or alternatively, the image caching software 114 can send rendering instructions for the requested cached product photo 160 directly to the client-side computer system 140.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention can comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system can view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions can be, for example, binaries, intermediate format instructions such as assembly language, or even source code.

Those skilled in the art will appreciate that the invention can be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention can also be practiced in distributed system environments where local and remote computer systems, which are linked (either by hardwired data links, wireless data links, or by a combination of hardwired and wireless data links) through a network, both perform tasks. As such, in a distributed system environment, a computer system can include a plurality of constituent computer systems. In a distributed system environment, program modules can be located in both local and remote memory storage devices.

Those skilled in the art will also appreciate that the invention can be practiced in a cloud-computing environment. Cloud computing environments can be distributed, although this is not required. When distributed, cloud computing environments can be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model can also come in the form of various service models such as, for example, Software as a Service ("SaaS"), Platform as a Service ("PaaS"), and Infrastructure as a Service ("IaaS"). The cloud-computing model can also be deployed using different deployment models such as private cloud, community cloud, public cloud, hybrid cloud, and so forth.

In at least one implementation, such as a cloud-computing environment, can comprise a system that includes one or more hosts that are each capable of running one or more virtual machines. During operation, virtual machines emulate an operational computing system, supporting an operating system and perhaps one or more other applications as well. In at least one implementation, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A server in a network comprising one or more remote client computer systems, the server configured for just-in-time rendering using a distributed cache server, comprising:
   one or more processors; and
   one or more computer-readable media having stored thereon executable instructions that when executed by the one or more processors configure the server to:
      receive at least one edited photo comprising at least one available selection of a customization option;
      cache the at least one edited photo comprising the at least one available selection of the customization option within a distributed cache server;
      receive a user request comprising the at least one available selection of the customization option as represented in the at least one edited photo cached within the distributed cache server and at least one available selection of at least one additional customization option that is different from the at least one available selection of the customization option;
      based on the user request;
         access the at least one edited photo cached within the distributed cache server,
         access at least one additional edited photo comprising the at least one available selection of the at least one additional customization option, and
         perform a layering operation on the at least one edited photo cached within the distributed cache server and the at least one additional edited photo to generate a requested product photo having visual elements of the at least one edited photo cached within the distributed cache server and the at least one additional edited photo;
cache the requested product photo within the distributed cache server such that both the at least one edited photo and the requested product photo generated by performing the layering operation using the at least one edited photo initially cached within the distributed cache server and the at least one additional edited photo become cached within the distributed cache server; and
send display instructions for the cached requested product photo to a user over a network.

2. The server of claim 1, wherein the server is further configured to validate the at least one edited photo before caching.

3. The server of claim 1, wherein caching the at least one edited photo comprising the at least one available selection of the customization option comprises caching at least three sizes of the at least one edited photo comprising the at least one available selection of the customization option.

4. The server of claim 1, wherein the executable instructions include instructions that are executable to configure the server to receive a request to cache an additional product photo comprising the at least one available selection of the customization option and at least one available selection of at least one additional customization option.

5. The server of claim 1, wherein the at least one additional edited photo comprising the at least one available selection of the at least one additional customization option comprises a cached additional product photo.

6. The server of claim 1, wherein the cached additional product photo is generated via a previous layering operation based upon the predetermined layering protocol.

7. The server of claim 1, wherein layering the at least one edited photo and the at least one additional edited photo comprises flattening the at least one edited photo with the at least one additional edited photo.

8. At a server on a network comprising the server and one or more remote computer systems, the server further comprising one or more processors and one or more computer-readable media having stored thereon executable instructions that, when executed by the one or more processors, cause the server to perform a method of just-in-time rendering using a distributed cache server, the method comprising:
receiving at least one edited photo comprising at least one available selection of a customization option;
caching the at least one edited photo comprising the at least one available selection of the customization option within a distributed cache server;
receiving a user request comprising the at least one available selection of the customization option as represented in the at least one edited photo cached within the distributed cache server and at least one available selection of at least one additional customization option that is different from the at least one available selection of the customization option;
based on the user request;
accessing the at least one edited photo cached within the distributed cache server,
accessing at least one additional edited photo comprising the at least one available selection of the at least one additional customization option, and
performing a layering operation on the at least one edited photo cached within the distributed cache server and the at least one additional edited photo to generate a requested product photo having visual elements of the at least one edited photo cached within the distributed cache server and the at least one additional edited photo;
caching the requested product photo within the distributed cache server such that both the at least one edited photo and the requested product photo generated by performing the layering operation using the at least one edited photo initially cached within the distributed cache server and the at least one additional edited photo become cached within the distributed cache server; and
sending display instructions for the cached requested product photo to a user over a network.

9. The method of claim 8, further comprising caching at least three sizes of the at least one edited photo comprising the at least one available selection of the customization option.

10. The method of claim 8, further comprising receiving a request to cache an additional product photo comprising the at least one available selection of the customization option and at least one available selection of at least one additional customization option.

11. The method of claim 8, wherein the at least one additional edited photo comprising the at least one available selection of the at least one additional customization option comprises a cached additional product photo.

12. The method of claim 11, wherein the cached additional product photo is generated via a previous layering operation based upon the predetermined layering protocol.

13. The method of claim 8, wherein layering the at least one edited photo and the at least one additional edited photo comprises flattening the at least one edited photo with the at least one additional edited photo.

14. A server comprising one or more processors and one or more computer-readable media having stored thereon executable instructions that when executed by the one or more processors configure the server to perform a method of just-in-time rendering using a distributed cache server, the method comprising:
receiving at least one edited photo comprising at least one available selection of a customization option;
caching, at a caching module, the at least one edited photo comprising the at least one available selection of the customization option within a distributed cache server;
receiving a user request comprising the at least one available selection of the customization option as represented in the at least one edited photo cached within the distributed cache server and at least one available selection of at least one additional customization option that is different from the at least one available selection of the customization option;
accessing, within an image database, the at least one edited photo comprising the at least one available selection of the customization option and at least one additional edited photo comprising the at least one available selection of the at least one additional customization option;
layering, with a stitching module and in accordance with a predetermined layering protocol, the at least one edited photo comprising the at least one available selection of the customization option with the at least one additional edited photo comprising the at least one available selection of the at least one additional customization option to generate a requested product photo having visual elements of the at least one edited photo and the at least one additional edited photo;
caching, at the caching module, the requested product photo within the distributed cache server such that both the at least one edited photo and the requested product photo generated by layering the at least one edited photo initially cached within the distributed cache server with the at least one additional edited photo become cached within the distributed cache server; and sending display instructions for the cached requested product photo to a user over a network.

15. The method of claim 14, further comprising receiving a request to cache an additional product photo comprising the at least one available selection of the customization option and at least one available selection of at least one additional customization option.

16. The method of claim 14, wherein the at least one additional edited photo comprising the at least one available selection of the at least one additional customization option comprises a cached additional product photo.

17. The method of claim 16, wherein the cached additional product photo is generated via a previous layering operation based upon the predetermined layering protocol.

18. The method of claim 14, further comprising flattening the layered at least one edited photo comprising the at least one available selection of the customization option and the at least one additional edited photo comprising the at least one available selection of the at least one additional customization option to generate the requested product photo.

* * * * *